US009254234B2

(12) United States Patent
Cooper et al.

(10) Patent No.: US 9,254,234 B2
(45) Date of Patent: Feb. 9, 2016

(54) ROBOTIC STRONG ARM

(71) Applicants: Rory A. Cooper, Gibsonia, PA (US); Garrett G. Grindle, Pittsburgh, PA (US); Mark McCartney, Pittsburgh, PA (US)

(72) Inventors: Rory A. Cooper, Gibsonia, PA (US); Garrett G. Grindle, Pittsburgh, PA (US); Mark McCartney, Pittsburgh, PA (US)

(73) Assignees: University of Pittsburgh—Of The Commonwealth System of Higher Education, Pittsburgh, PA (US); The United States of America as Represented by the Department of Veterans Affairs, Washington, DC (US); UPMC, Pittsburgh, PA (US)

( * ) Notice: Subject to any disclaimer, the term of this patent is extended or adjusted under 35 U.S.C. 154(b) by 152 days.

(21) Appl. No.: 13/861,283

(22) Filed: Apr. 11, 2013

(65) Prior Publication Data

US 2014/0135981 A1 May 15, 2014

Related U.S. Application Data

(60) Provisional application No. 61/622,867, filed on Apr. 11, 2012.

(51) Int. Cl.

| | |
|---|---|
| ***G06F 19/00*** | (2011.01) |
| ***A61G 7/10*** | (2006.01) |
| *A61G 5/14* | (2006.01) |

(52) U.S. Cl.

CPC ................ *A61G 7/1017* (2013.01); *A61G 5/14* (2013.01); *A61G 7/109* (2013.01); *A61G 7/1048* (2013.01);

(Continued)

(58) Field of Classification Search

CPC ............ A61G 7/1017; A61G 2203/40; A61G 7/1048; A61G 7/1051; A61G 7/1059; A61G 7/1061; A61G 7/1065; A61G 7/1076; A61G 7/109; A61G 2200/32; A61G 2200/34; A61G 2200/36; A61G 2200/52; A61G 2203/12; A61G 5/14

USPC ......... 700/245, 247, 250, 255, 257, 258, 260, 700/261, 264; 318/568.11, 568.13, 568.16, 318/568.17, 568.21; 5/81.1 R, 83.1, 86.1, 5/84.1, 81.1 RP

See application file for complete search history.

(56) References Cited

U.S. PATENT DOCUMENTS

| | | | | |
|---|---|---|---|---|
| 8,621,684 | B2 * | 1/2014 | Okumatsu | 5/83.1 |
| 8,945,148 | B2 * | 2/2015 | Solomon et al. | 606/130 |

(Continued)

OTHER PUBLICATIONS

Alqasemi et al., Maximizing Manipulation Capabilities for People with Disabilities Using a 9-DoF Wheelchair-Mounted Robotic Arm System, 2007, Proceedings of the 2007 IEEE 10th International Conference on Rehabilitation Robotics, Jun. 12-15, Noordwijk, The Netherlands, pp. 212-221.*

(Continued)

*Primary Examiner* — Dalena Tran
*Assistant Examiner* — Jaime Figueroa
(74) *Attorney, Agent, or Firm* — Paul D. Bangor, Jr.; Clark Hill, PLC

(57) ABSTRACT

A robotic strong arm (RSA) for assisting in the transfer of a person from a first surface to a second surface, comprising: first and second members, wherein in each member comprises a prismatic joint having first and second ends and comprising inner and outer shells and a motor for powered linear movement of the outer shell with respect to the inner shell; a first powered joint interconnecting the second end of the first member with the first end of the second member, wherein the first powered joint provides movement of the second member with respect to the first member; wherein the first end of the first member is attached to a rotatable base and wherein the rotatable base is movably attached for powered movement along a component associated with, and extending around at least a portion of a periphery about, the first surface; and a computer controller for controlling movements of the outer shells, first powered joint, rotation of the rotatable base and movement of the rotatable base and RSA along the component.

20 Claims, 8 Drawing Sheets

(52) U.S. Cl.
CPC ............ *A61G 7/1051* (2013.01); *A61G 7/1059* (2013.01); *A61G 7/1061* (2013.01); *A61G 7/1065* (2013.01); *A61G 7/1076* (2013.01); *A61G 2200/32* (2013.01); *A61G 2200/34* (2013.01); *A61G 2200/36* (2013.01); *A61G 2200/52* (2013.01); *A61G 2203/12* (2013.01); *A61G 2203/40* (2013.01)

(56) References Cited

U.S. PATENT DOCUMENTS

| | | | | |
|---|---|---|---|---|
| 2002/0064444 | A1* | 5/2002 | Wunderly et al. | 414/680 |
| 2004/0001750 | A1* | 1/2004 | Kremerman | 414/744.1 |
| 2006/0079817 | A1* | 4/2006 | Dewald et al. | 601/5 |
| 2010/0204713 | A1* | 8/2010 | Ruiz Morales | 606/130 |
| 2011/0277235 | A1* | 11/2011 | Okumatsu | 5/83.1 |
| 2011/0282356 | A1* | 11/2011 | Solomon et al. | 606/130 |
| 2013/0053866 | A1* | 2/2013 | Leung et al. | 606/130 |

OTHER PUBLICATIONS

Xu et al, Enhanced bimanual manipulation assistance with the Personal Mobility and Manipulation Appliance—PerMMA, The 2010 IEEE/RSJ International Conference on Intelligent Robots and Systems, Oct. 18-22, 2010, Taipei, Taiwan, pp. 5042-5047.*

Jung et al., Advanced Robotic Residence for the Elderly—the Handicapped: Realization and User Evaluation, Proceedings of the 2005 IEEE 9th International Conference on Rehabilitation Robotics, Jun. 28-Jul. 1, 2005, Chicago, IL, USA, pp. 492-495.*

Alqasemi et al., Analysis, evaluation and development of wheelchair-mounted robotic arms, Proceedings of the 2005 IEEE 9th International Conference on Rehabilitation Robotics, Jun. 28-Jul. 1, 2005, Chicago, IL, USA, pp. 469-472.*

Martens et al, A Friend for Assisting Handicapped People, Mar. 2001, IEEE Robotics & Automation Magazine, pp. 57-65.*

Cooper et al, Personal Mobility and Manipulation Appliance-Design, Development, and Initial Testing, 2012, Proceedings of the IEEE vol. 100. No. 8, pp. 2505-2511.*

Finley, Margaret A., McQuade, Kevin J. and Rodgers, Mary M., Scapular kinematics during transfers in manual wheelchair users with and without shoulder impingement, Clinical Biomechanics, 2005, pp. 32-40, 20.

Gagnon, Dany, Nadeau Sylvie, Desjardins, Pierre and Noreau, Luc, Biomechanical assessment of sitting pivot transfer tasks using a newly developed instrumented transfer system among long-term wheelchair users, Journal of Biomechanics, 2008, pp. 1104-1110, 41.

Gagnon, Dany, Nadeau, Sylvie, Noreau, Luc, Dehail, Patrick and Piotte, France, Comparison of peak shoulder and elbow mechanical loads during weight-relief lifts and sitting pivot transfers among manual wheelchair users with spinal cord injury, Journal of Rehabilitation Research & Development, 2008, pp. 863-874, vol. 45, No. 6.

Gagnon, Dany, Nadeau, Sylvie, Noreau, Luc, Eng, Janice and Gravel Denis, Trunk and upper extremity kinematics during sitting pivot transfers performed by individuals with spinal cord injury, Clinical Biomechanics, 2008, pp. 279-290, 23.

Hess, Jennifer A., Kincl, Laurel D. and Mandeville, Comparison of Three Single-Person Manual for Bed-to-Wheelchair Transfers, Home Healthcare Nurse, Oct. 2007, pp. 572-579, vol. 25, No. 9.

Kirby, R. Lee, Smith, Cher, Fall During a Wheelchair Transfer: A Case of Mismatched Brakes, American Journal of Physical Medicine & Rehabilitation, 2001, pp. 302-304, vol. 80, No. 4.

Ummat, Samira and Kirby, R. Lee, Nonfatal wheelchair-related accidents reported to the National Electronic Injury Surveillance System, American Journal of Physical Medicine & Rehabilitation, Jun. 1994, pp. 163-167, vol. 73, No. 3.

Xiang, H., Chany, A-M, Smith, G.A., Wheelchair related injuries treated in US emergency departments, Injury Prevention, 2006, pp. 8-11, vol. 12.

Dudley, N.J., Cotter, D., Mulley, G.P., Wheelchair-related accidents, Clinical Rehabilitation, 1992,189-194, vol. 6.

Santaguida, Pasqualina L., Pierrynowski, Michael, Goldsmith, Charles and Fernie, Geoffrey, Comparison of cumulative low back loads of caregivers when transferring patients using overhead and floor mechaical lifting devices, Clinical Biomechanics, 2005, pp. 906-916, vol. 20.

Miller, Aaron, Engst, Chris, Tate, Robert B. and Yassi, Annalee, Evaluation of the effectiveness of portable ceiling lifts in a new long-term care facility, Applied Ergonomics 2006, pp. 377-385, vol. 37.

Engst, C., Chhokar, R., Miller, A., Tate, R.B. and Yassi, A., Effectiveness of overhead lifting devices in reducing the risk of injury to care staff in extended care facilities, Ergonomics, Feb. 2005, pp. 187-199, vol. 48, No. 2.

Speser, Scott, Mechanical Lift Systems, PN Magazine, Apr. 2011, pp. 57-59.

Bostelman, Roger and Albus, James, Robotic Patient Transfer and Rehabilitation Device for Patient Care Facilities or the Home, Advanced Robotics, 2008, pp. 1287-1307, v. 22.

Bostelman, Roger, Albus, James, Chang, Tommy, Hong, Tsai, Agrawal, Sunil K. and Ryu, Ji-Chul, HLPR Chair: A Novel Indoor Mobility-Assist and Lift System, ASME 2007, pp. 1-8.

Bostelman, James, Albus, James and Chang, Tommy, Recent Developments of the HLPR Chair, Abstract developed at the National Institute of Standards ad Techology within the Intelligent Systems Division from 2005 to 2006.

Bostelman, Roger, International Standards Efforts Towards Safe Accessibility Technology for Persons with Disabilities: Cross-Industry Activities, Aug. 24, 2010, pp. 1-20.

* cited by examiner

ROBOTIC STRONG ARM

RELATED APPLICATION

This application claims priority benefit under 35 U.S.C. §119(e) of U.S. Provisional Application No. 61/622,867, filed Apr. 11, 2012, the contents of which are herein incorporated by reference.

GOVERNMENTAL RIGHTS

This invention was made with government support under National Science Foundation Quality of Life Technology Engineering Research Center (Grant EEC-0540865) and Department of Veterans Affairs Center of Excellence for Wheelchairs and Associated Rehabilitation (Grant B3142C). The government has certain rights in the invention.

BACKGROUND

The present disclosure relates to a novel Robotic Strong Arm (RSA) and device to aid in the transfer of people with disabilities to and from their wheelchairs or electric powered wheelchair onto other surfaces.

There are approximately 1.5 million people in the United States who have disabilities that require them to use a wheelchair. One study found that 60% of people reported shoulder pain since beginning their wheelchair use. In comparison, only about 4.7% of the general population report regular shoulder pain. Sitting pivot transfers (SPTs) are ranked among the most strenuous daily tasks of wheelchair users. Repetitions of this task over time can be detrimental for the shoulder and elbow joints of wheelchair users.

Biomechanics

There are variations in wheelchair users' movements when transferring themselves depending on their level of injury. When a patient transfers him/herself from a wheelchair to another surface, most of their weight is initially supported by their trailing upper extremity (U/E). As they lose contact with the seat, weight is shifted to the leading U/E. During wheelchair transfers, large forces are placed on the shoulder and elbow joints. The leading shoulder encounters higher displacement and velocities than the trailing one. This can cause damage in the leading arm to be accelerated and the onset of pain in this arm to occur sooner.

When wheelchair users are transferred by other people, the biomechanics of the transfer take on a different form. Strain is still placed on the wheelchair-users shoulder joints, although it is more evenly distributed across the sagittal plane. There is also an additional factor of strain placed on the lower back of the person assisting with the transfer. One study found that a pivot transfer puts 112 lbs of force onto the clinician assisting with the transfer and raises their risk of developing a lower back disorder to 38.8%.

Injuries

Between 1973 and 1987, 770 wheelchair-related accidents that led to death were reported to the U.S. Consumer Products Safety Commission. 8.1% of these accidents were caused by falls during transfers. Between 1986 and 1990, there were an estimated 36,000 wheelchair-related accidents in the U.S. that resulted in a visit to the emergency department. 17% of these accidents were due to falls during transfers. In 2003, more than 100,000 wheelchair related injuries were treated in U.S. emergency departments, showing an upward trend in the number of injuries over time.

When wheelchair users are transferred by other people, there is an additional risk of injury to the caretaker. In one study, of the 48 accidents reported by the 174 participants, 15.5% involved attendants. There were more than 1,325,000 home care workers or clinicians in the United States in 2004. This group is expected to grow by 56% from 2004 to 2014. Lower back injuries are a major risk for this group, and one estimate found that 10.5% of back injuries in the United States are associated with transferring patients. In one study investigating bed to chair transfers, it was found that healthcare workers experience up to 3500N of compressive forces during a single transfer. In another study where lifts were implemented in a hospital to assist with patient transfers, it was found that over a 3 year period, there was a 70% decrease in claims cost at the intervention facility. The cost of compensation for injuries at this facility also decreased, with a 241% increase in the comparison facility.

Lifts

One technique that is used in many healthcare facilities is to move patients around using ceiling-lifts. In one study where lifts were added to an extended care unit, 71.4% of care staff reported that it became their preferred method of transferring patients and 96% believed that the ceiling lifts made lifting residents easier. While these lifts effectively transfer people without placing as much strain on the caretaker, they are often not used because they are time-consuming. In many cases, legislation concerning the implementation of lifts is focused on the caretakers' comfort and safety as opposed to the patients'. In rare cases, these lifts can even subject the patient to bruising or skin tearing. Another major concern when transferring patients using a lift system is that the patient may feel that being moved around in such a manner is undignified.

High-Tech Devices

Few high tech devices are report in the literature. One such device is the Home Lift, Position, and Rehabilitation chair (HLPR) is currently being developed and will be able to lift a patient, rotate, and place him/her on a toilet, chair, or bed. However, this chair is meant for home use only and an incline of 10 degrees can cause tipping.

The transfer device market is populated by well-established players with products that have been available for a long time. Patient lifts are the most common type of lift that are characterized by having 4 caster wheels, 2 long legs, and a lift arm that is operated using a manual or powered hydraulic jack. The person is placed in a sling, hoisted vertically with the lift arm. Two well-known manufactures of this type of device are Hoyer and Invacare. Another type, more typical of institutional settings (and some highly modified homes), is the overhead lift. This type of lift system utilizes a track or gantry rail system mounted to the ceiling over a strategic area, such as a bed or bathroom, which a winch unit travels on. The person is placed in a sling, they are hoisted by the winch, and the care giver moves them about on the track or gantry.

Numerous other types of devices, ranging from low tech to high tech, exist for aiding with transfers. On the low tech side, transfer boards which are a short piece of smooth laminated wood that can be placed between person's chair and the surface they are transferring to or from. The caregiver then slides (often more like dragging) the person across board and onto the destination surface. Some devices are highly specialized. The Hover Jack (Hover Tech International) is an inflatable cushion that is specifically designed to aid a caregiver in lifting people off the floor and into a bed. There are many styles of chairs that specifically designed to help lower people in an out of bath tubs. On the high tech side is Panasonic's transfer assist robot (http://www.youtube.com/watch?v=LBMJCI-FzrM), which acts much like a forklift for moving people.

SUMMARY

In a preferred aspect, the present disclosure is directed to a robotic strong arm (RSA) for assisting in the transfer of a person from a first surface to a second surface, comprising: first and second members, wherein each member comprises a prismatic joint having first and second ends and comprising inner and outer shells and a motor for powered linear movement of the outer shell with respect to the inner shell; a first powered joint interconnecting the second end of the first member with the first end of the second member, wherein the first powered joint provides movement of the second member with respect to the first member; wherein the first end of the first member is attached to a rotatable base and wherein the rotatable base is movably attached for powered movement along a component associated with, and extending around at least a portion of a periphery about, the first surface; and a computer controller for controlling movements of the outer shells, first powered joint, rotation of the base and movement of the base and RSA along the component.

In an additional preferred aspect, the present disclosure is more specifically directed to a robotic strong arm wherein the first surface comprises a seat of a wheelchair; wherein the seat has a front, a back and first and second sides.

In yet another preferred aspect, the present disclosure is directed to a robotic strong arm wherein the component comprises a track, rod or other structure along which the RSA may be moved to position the RSA adjacent to or near the back, first side or second side of the seat or any point along the periphery between the first and second sides.

In a further preferred aspect, the present disclosure is directed to a robotic strong arm further comprising a sensor associated with each outer shell for sensing a relative position of the outer shell.

In another preferred aspect, the present disclosure is directed to a robotic strong arm wherein the movement of the second member with respect to the first member comprises rotational or angular movement of the second member with respect to the first member.

In a further preferred aspect, the present disclosure is directed to a robotic strong arm wherein each of the inner and outer shells of each of the first and second members comprises a double-walled construction.

In an additional preferred aspect, the present disclosure is more specifically directed to a robotic strong arm wherein each of the inner and outer shells of each of the first and second members comprises a double-walled construction made of plastic or reinforced plastic.

In an additional preferred aspect, the present disclosure is more specifically directed to a robotic strong arm wherein each of the inner and outer shells of each of the first and second members comprises a double-walled construction made of plastic reinforced with metal or stainless steel rods.

In a further preferred aspect, the present disclosure is directed to a robotic strong arm wherein each of the inner and outer shells of each of the first and second members defines a polygonal cross-section.

In another preferred aspect, the present disclosure is directed to a robotic strong arm further comprising a motor for powering reversible rotation of the base and first member so that the second member may be moved toward and/or away from the first surface.

In a further preferred aspect, the present disclosure is directed to a robotic strong arm wherein the robotic strong arm may be used for both stand-pivot transfers, where a person on the first surface has some ability to stand and place some weight on the ground and/or for fully dependent transfers, where the person being transferred to or from the first surface is in a sling and the person's weight is fully on the robotic strong arm.

In another preferred aspect, the present disclosure is directed to a robotic strong arm further comprising an effector attached to the second end of the second member wherein the effector may be used for grasping or manipulating objects located out of reach of a person sitting on the first surface.

In a further preferred aspect, the present disclosure is directed to a robotic strong arm wherein the second surface is defined by a bed, bench, toilet, chair or the like.

In another preferred aspect, the present disclosure is directed to a robotic strong arm (RSA) for assisting in the transfer of a person from a first surface defined by a seat of a wheelchair to a second surface, comprising: first and second members, wherein each member comprises a prismatic joint having first and second ends and comprising inner and outer shells and a motor for powered linear movement of the outer shell with respect to the inner shell; a first powered joint interconnecting the second end of the first member with the first end of the second member, wherein the first powered joint provides movement of the second member with respect to the first member; wherein the first end of the first member is attached to a powered rotating base and wherein the powered rotating base is movably attached to a component of the wheelchair for powered movement along the component extending around at least a portion of a periphery about the first surface; and a computer controller for controlling movements of the outer shells, first powered joint, rotation of the base and movement of the base and RSA along the component.

In a further preferred aspect, the present disclosure is directed to a robotic strong arm wherein the second surface is defined by a bed, bench, toilet, chair or the like.

In another preferred aspect, the present disclosure is directed to a robotic strong arm wherein each of the inner and outer shells of each of the first and second members defines a polygonal cross-section and comprises a double-walled construction made of plastic, reinforced plastic or plastic reinforced with metal or stainless steel rods.

In a further preferred aspect, the present disclosure is directed to a robotic strong arm wherein reversible rotation of the powered rotating base and attached first member allows the second member to be moved toward and/or away from the first surface.

In another preferred aspect, the present disclosure is directed to a robotic strong arm further comprising an effector attached to the second end of the second member wherein the effector may be used for grasping or manipulating objects located out of reach of a person sitting on the first surface.

In yet another preferred aspect, the present disclosure is directed to a robotic strong arm wherein the component comprises a track, rod or other structure along which the RSA may be moved to position the RSA adjacent to or near the back, first side or second side of the seat or any point along the periphery between the first and second sides.

In an additional preferred aspect, the present disclosure is directed to a robotic strong arm wherein the robotic strong arm may be used for both stand-pivot transfers, where a person on the first surface has some ability to stand and place some weight on the ground and/or for fully dependent transfers, where the person being transferred to or from the first surface is in a sling and the person's weight is fully on the robotic strong arm.

DETAILED DESCRIPTION

Figure 1:
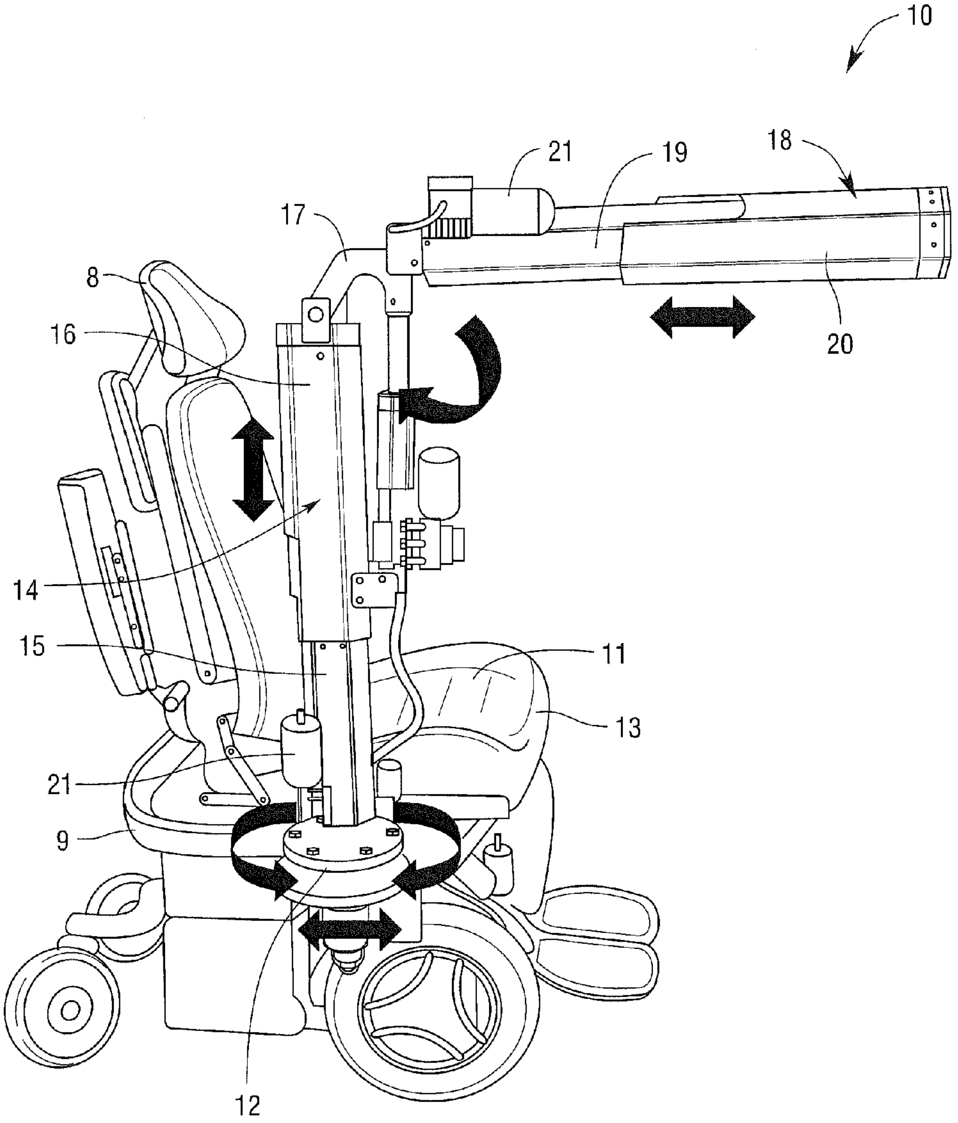
FIG. 1 shows a perspective view of a robotic strong arm according to a preferred embodiment of the present disclosure showing the second or distal member in a generally horizontal position.

It is to be understood that the descriptions of the present disclosure have been simplified to illustrate elements that are relevant for a clear understanding of the present disclosure, while eliminating, for purposes of clarity, other elements that may be well known. Those of ordinary skill in the art will recognize that other elements are desirable and/or required in order to implement the present disclosure. However, because such elements are well known in the art, and because they do not facilitate a better understanding of the present disclosure, a discussion of such elements is not provided herein. Additionally, it is to be understood that the present disclosure is not limited to the embodiments described above, but encompasses any and all embodiments within the scope of the description and the following claims.

The purpose of the RSA 10 is to aid in the transfers of people 22 with disabilities to and from the seat 13 (having surface 11) of their wheelchairs or electric powered wheelchairs (EPW) 8 onto other surfaces 30 such as a bed, shower bench, toilet, or another chair. The RSA 10 can be used for both stand-pivot transfers, where the person 22 has some ability to stand and places some weight on the ground or it can be used for fully dependent transfers, where the person 22 being transferred is in a sling 28 and weight is fully on the RSA 10. The RSA 10 is fixed to an EPW 8 to allow for use in community settings; however, it could also be mounted on a bed or another mobile platform for use in institutional settings.

The addition of an end effector (not shown) also makes the RSA 10 suitable for manipulation applications. For example the RSA 10 with a powered prosthetic hook hand could be used to help people 22 with disabilities retrieve heavier items, such as gallon milk jugs, large pots, or suitcases. The RSA 10 has several advantages over currently available technology.

Devices such as patient lifts, overhead lifts, and standing lifts are generally limited to homes or institutional settings. Since the RSA 10 is mounted to an EPW 8 it can be used in the home as well as the community. The RSA 10 also may also have an advantage in a smaller bathroom where an EPW 8 and patient lift will not fit at the same time. Additionally, the RSA 10 may be preferable for users 22 who are traveling and wish to take only one device.

Many lifting technologies use manually operated or in some high end models use a powered mechanism, such as a hydraulic jack, to perform the vertical lifting motion. However, moving the person, left, right, or rotating them is done completely manually. The RSA 10 has 5 powered Degrees of Freedom (DOF) which may reduce the effort need to move the person 22. Since the RSA 10 has 5 DOF it may be more maneuverable in certain scenarios.

Few lifting devices (with none widely available) employ the use of sensors and computer algorithms. This attribute of the RSA 10 has potential increase safety by detecting potentially dangerous situations and warning the user 22 or correcting automatically. In addition programs that run a preprogrammed sequence could make the transferring process more uniform from lift to lift, and maybe make it cognitively simpler for the caregiver.

The RSA 10 fundamentally differs from related devices currently on the market in that is has 5 DOFs that are under powered robotic control (can be sensed and actuated by a computer 40) and can be directly attached to an EPW 8. The unique geometry of the RSA 10 gives it an advantage over other products, especially in confined spaces, such as bathrooms.

Figure 2:
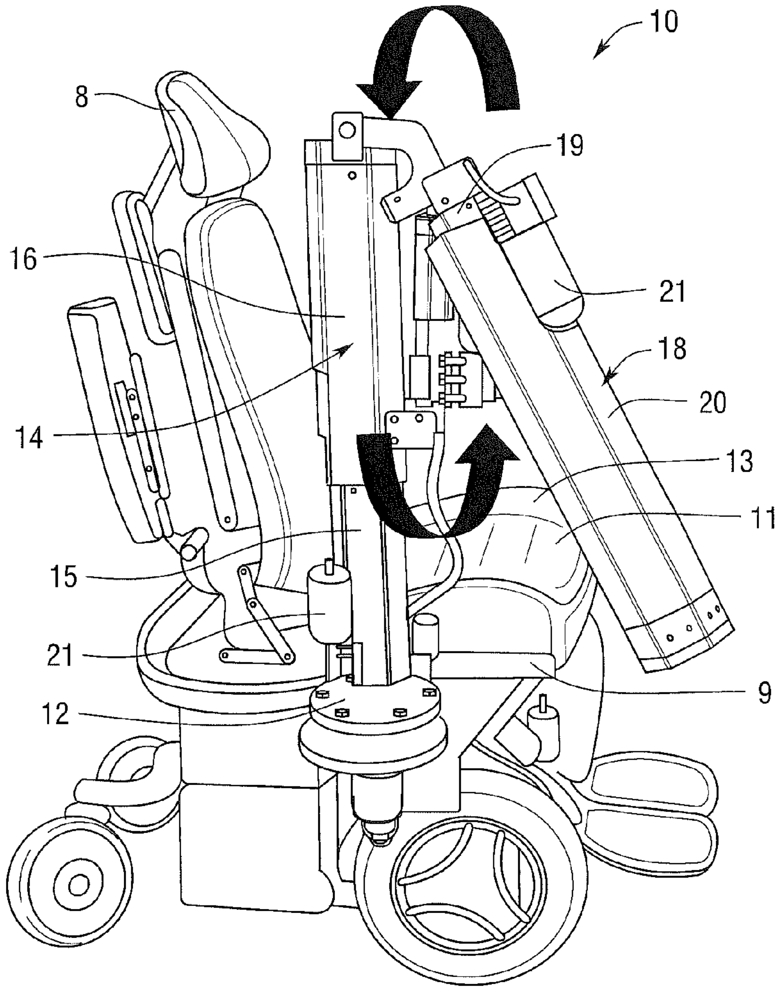
FIG. 2 shows a perspective view of a robotic strong arm of FIG. 1 according to a preferred embodiment of the present disclosure showing the second or distal member in a downward angled position.
Figure 8:
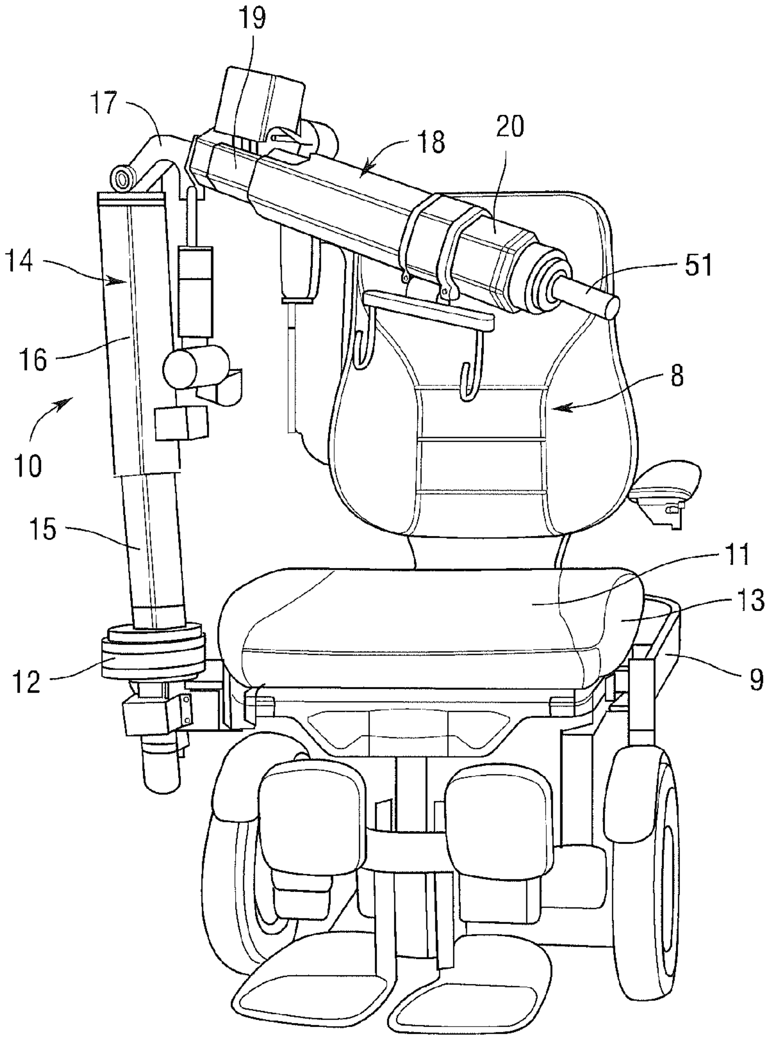
FIG. 8 shows a perspective view of a robotic strong arm according to another preferred embodiment of the present disclosure showing the second or distal member in a generally horizontal position.

As shown in FIGS. 1-2 and 8, the RSA 10 features 5 powered degrees of freedom DOF. The first DOF is a track and carriage system 9 that allows the RSA 10 to move about the EPW's 8 seat frame 13 having first surface 11. The advantage is that the RSA 10 can be moved to either side, have a larger workspace on the side of the EPW 8, and can be stored behind the EPW 8, without adding width to the EPW 8, when not in use. The second DOF acts like a shoulder joint/base 12 and allows the RSA 10 to rotate internally toward the user 22 on first surface 11 or externally away from the user 22 on first surface 11. The third DOF is prismatic and allows the proximal segment 14 to extend in length. The fourth DOF is a rotating elbow joint 17 that connects the proximal segment 14 to the distal segment 18. The fifth DOF is another prismatic joint similar to the third DOF, which allows the distal segment 18 to extend.

Figure 7:
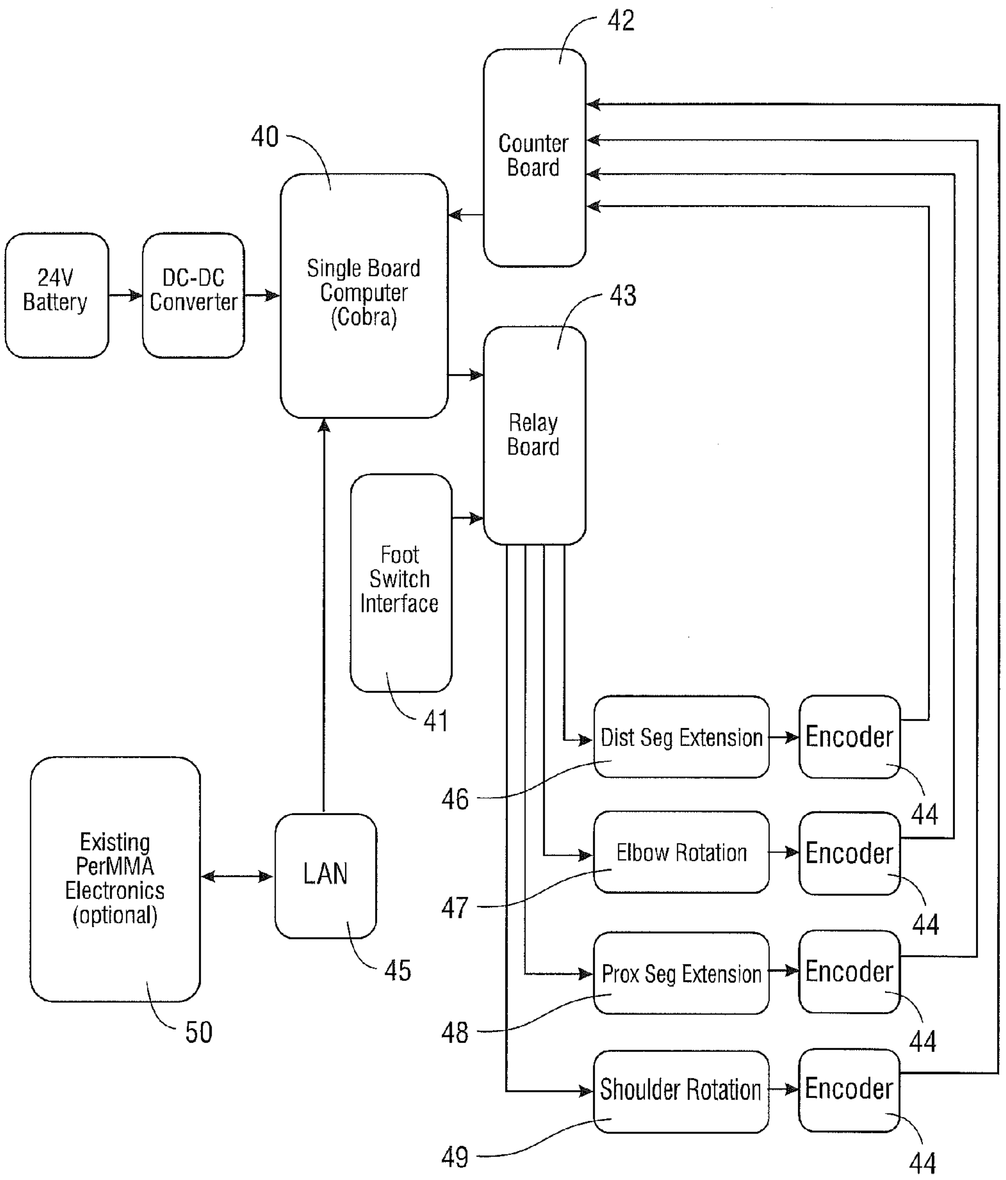
FIG. 7 is a schematic view of the components of a robotic strong arm according to a preferred embodiment of the present disclosure.

As shown in FIG. 7, the preferred core electronic components that drive the RSA 10 consist of a single board computer SBC 40, a counter board 42, and custom designed relay board 43. These components connect with various peripherals such as encoders 44 (for sensing position), manual switch interfaces 41, or a local area network 45, which allows the RSA 10 to connect to other computers (including its mother project Personal Mobility and Manipulation Appliance (PerMMA) 50). The SBC 40 provides the programmability, memory storage, and data bus capability to the RSA 10. The relay board 43 is used to translate low current logic signals from the SBC 40 into high current switching needed to control the motors 21 and linear actuators that make the RSA 10 move. The counter board 42 efficiently translates the incremental encoder 44 data into a form the can be readily used by programs running on the SBC 40.

Fabrication

Figure 3:
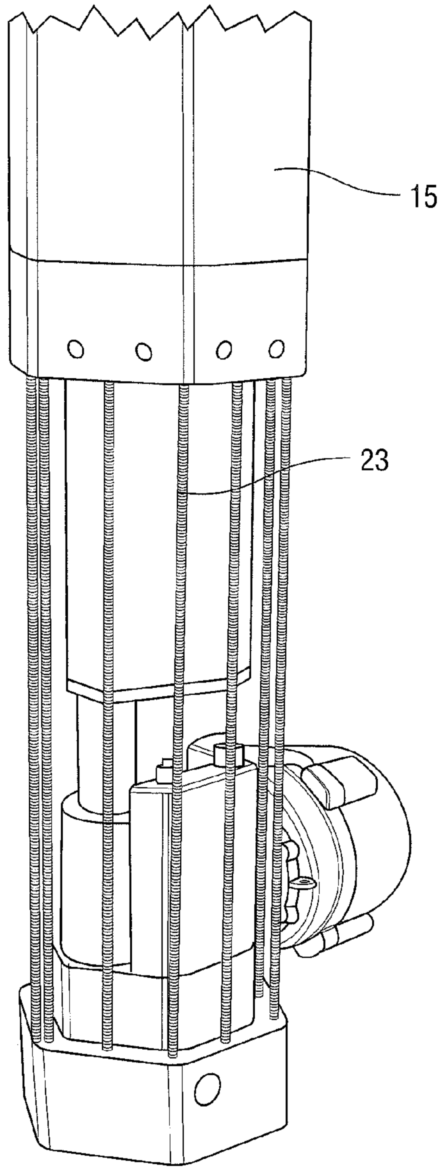
FIG. 3 shows a partial exploded view of a part of a polygonal member of a robotic strong arm according to a preferred embodiment of the present disclosure showing preferred components thereof.
Figure 4:
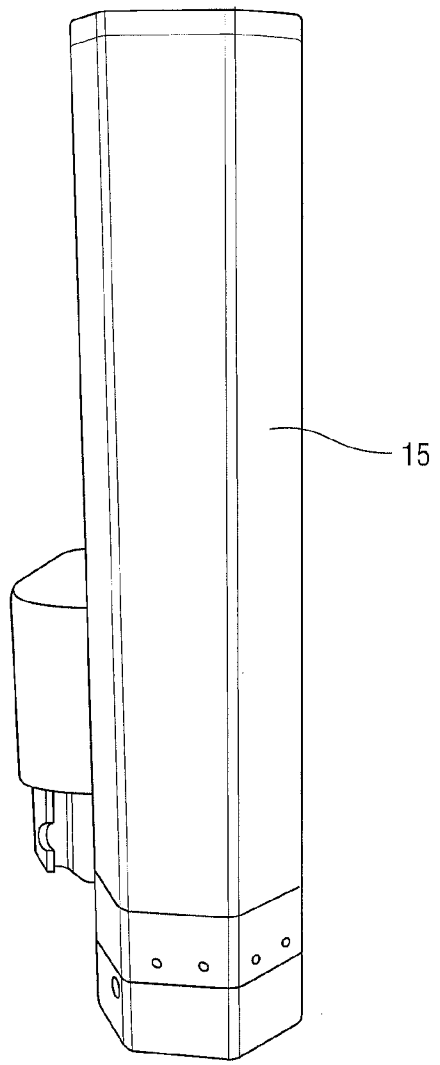
FIG. 4 shows an elevational view of a part of a polygonal member of a robotic strong arm according to a preferred embodiment of the present disclosure.
Figure 5:
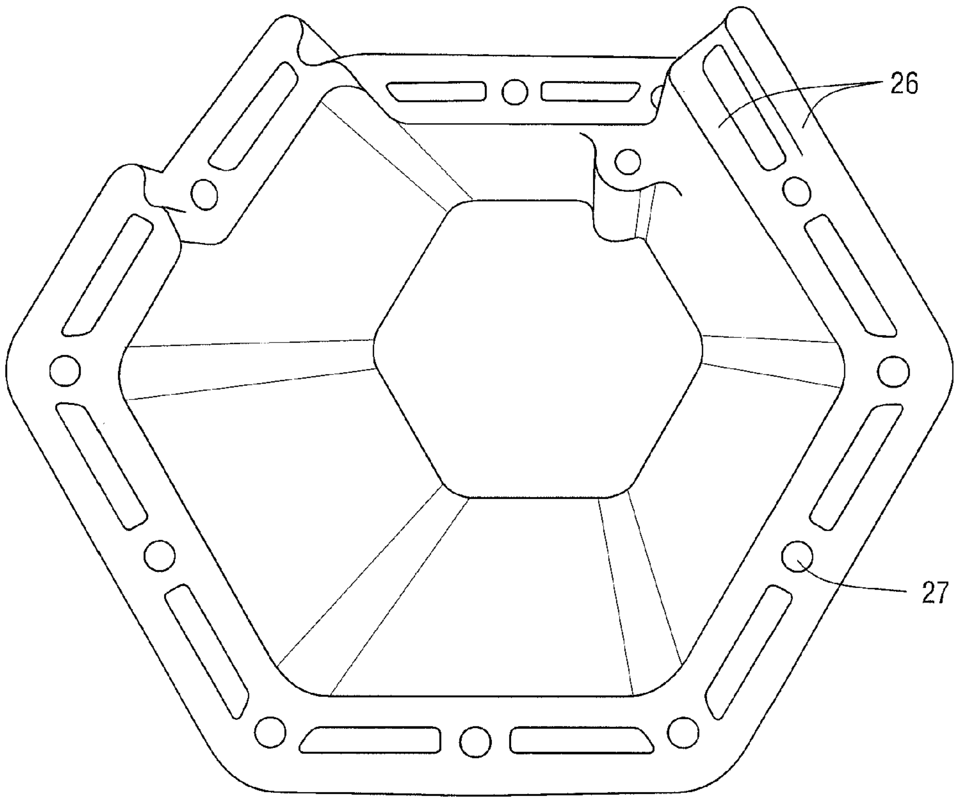
FIG. 5 shows a view of a preferred double wall construction of a part of a polygonal member of a robotic strong arm according to a preferred embodiment of the present disclosure.

As shown in FIGS. 3-5, The RSA 10 has several preferred construction features. The proximal segment 14 and distal segment 18, which are identical in terms of construction, are made of inner shells 15, 19 and an outer shells 16, 20, which slide past each other to form the bearing surface of the prismatic joints 14, 18. The cross sectional geometry of each shell 15, 16, 19, and 20 preferably is of a double walled, interconnected hexagonal shape 26 having holes 27 therein for receiving metal or stainless steel rods 23. The hexagon shape 26 helps keep the prismatic joints 14, 18 from rotating, increases the bearing surface area (versus a square), allows the elbow 17 to be aligned so it is stronger normal to the elbows axis of rotation, and minimizes the overall volume taken up by the shells 15, 16, 19, and 20 (versus a square). The double wall 26 increases the wall strength versus single wall (half as thick), while using less plastic than a solid wall of similar thickness. The shells 15, 16, 19, and 20 preferably are made of plastic and preferably are created using Selective Laser Sintering (SLS). The plastic wall sections 26 of shells 15, 16, 19, and 20 of the proximal and distal segments 14 and 18, respectively, are preferably reinforced in tension with metal or stainless steel threaded rods 23, which are embedded in holes 27 in the walls 26. The plastic walls 26 are very strong in compression and the metal or stainless steel rods 23 are very strong in tension, which makes the overall segments 14 and 18 and respective shells 15, 16, 19, and 20 very strong.

Operation

Figure 6:
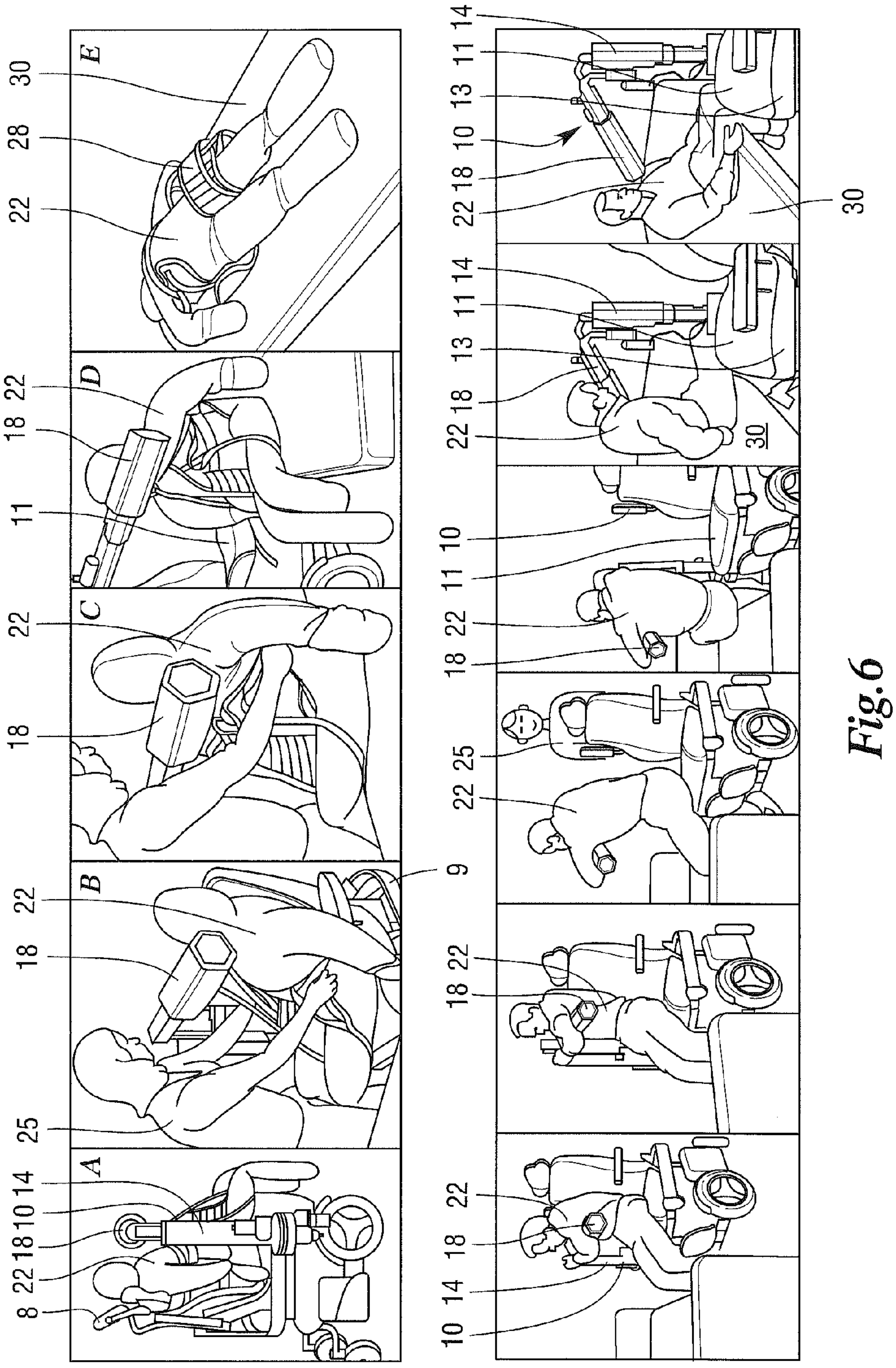
FIG. 6 shows preferred methods of using a robotic strong arm according to a preferred embodiment of the present disclosure to assist with stand-pivot transfers, where a user has some ability to stand and place some weight on the ground and/or for fully dependent transfers, where the person being transferred to or from by the robotic strong arm is in a sling and the person's weight is fully on the robotic strong arm.

As shown in FIG. 6, the RSA 10 can be operated to perform two different types of transfers: fully dependent sling transfers and stand pivot transfers. Both types of transfers require the assistance of a caregiver 25; however, the RSA 10 is designed to reduce the amount of effort the caregiver 25 exerts. With the fully dependent sling transfer the caregiver 10 places the person 22 to be transferred into a sling 28. The sling 28 is hooked to the distal segment 18 of the RSA 10 and the caregiver 25 then uses the button interface 41 or 51 to move the person 22 to a different surface 30 from first surface 11 on the seat 13 of EPW 8. With the stand pivot transfer, the person 22 being transferred grasps the distal segment 18 of RSA 10 directly and places their weight over the distal segment 18 of the RSA 10. If needed, the caregiver 25 can further secure the person 22 being transferred by grasping them. The caregiver 25 uses the button interface 41 or 51 to move the person 22 to a different surface 30, such as a chair or bench, with the RSA 10 providing most of force for lifting.

It should be understood that while this disclosure has been described herein in terms of specific embodiments set forth in detail, such embodiments are presented by way of illustration of the general principles of the disclosure, and the disclosure is not necessarily limited thereto. Certain modifications and variations in any given material, process step or chemical formula will be readily apparent to those skilled in the art without departing from the true spirit and scope of the present disclosure, and all such modifications and variations should be considered within the scope of the claims that follow.

The invention claimed is:

1. A robotic strong arm (RSA) for assisting in the transfer of a person from a first surface to a second surface, comprising:

first and second members, wherein each member comprises a prismatic joint having first and second ends and comprising inner and outer shells and a motor for powered linear movement of the outer shell with respect to the inner shell;

a first powered joint interconnecting the second end of the first member with the first end of the second member, wherein the first powered joint provides movement of the second member with respect to the first member;

wherein the first end of the first member is attached to a rotatable base and wherein the rotatable base is movably attached for powered movement along a component associated with, and extending around at least a portion of a periphery about, the first surface;

a computer controller for controlling movements of the outer shells, first powered joint, rotation of the rotatable base and movement of the rotatable base and RSA along the component;

a sensor associated with one or both outer shells for sensing position information for one or both outer shells and providing said position information to the computer controller; and a user interface to the computer controller for inputting commands for movement of the RSA; wherein the computer controller detects an onset of a dangerous positioning of the RSA and warns the user before and/or during said dangerous positioning of the RSA.

2. The robotic strong arm of claim 1 wherein the first surface comprises a seat of a wheelchair; wherein the seat has a front, a back and first and second sides.

3. The robotic strong arm of claim 2 wherein the component comprises a track, rod or other structure along which the RSA may be moved to position the RSA adjacent to or near the back, first side or second side of the seat or any point along the periphery between the first and second sides.

4. The robotic strong arm of claim 1 wherein the computer controller automatically moves the RSA out of, or prevents the RSA from entering, said dangerous positioning.

5. The robotic strong arm of claim 1 wherein the movement of the second member with respect to the first member comprises rotational or angular movement of the second member with respect to the first member.

6. The robotic strong arm of claim 1 wherein each of the inner and outer shells of each of the first and second members comprises a double-walled construction.

7. The robotic strong arm of claim 1 wherein each of the inner and outer shells of each of the first and second members comprises a double-walled construction made of plastic or reinforced plastic.

8. The robotic strong arm of claim 1 wherein each of the inner and outer shells of each of the first and second members comprises a double-walled construction made of plastic reinforced with metal or stainless steel rods.

9. The robotic strong arm of claim 1 wherein each of the inner and outer shells of each of the first and second members defines a polygonal cross-section.

10. The robotic strong arm of claim 1 further comprising a motor for powering reversible rotation of the rotatable base and first member so that the second member may be moved toward and/or away from the first surface.

11. The robotic strong arm of claim 1 wherein the robotic strong arm may be used for both stand-pivot transfers, where a person on the first surface has some ability to stand and place some weight on the ground and/or for fully dependent transfers, where the person being transferred to or from the first surface is in a sling and the person's weight is fully on the robotic strong arm.

12. The robotic strong arm of claim 1 further comprising an effector attached to the second end of the second member wherein the effector may be used for grasping or manipulating objects.

13. The robotic strong arm of claim 1 wherein the second surface is defined by a bed, bench, toilet, chair or the like.

14. A robotic strong arm (RSA) for assisting in the transfer of a person from a first surface defined by a seat of a wheelchair to a second surface, comprising:

first and second members, wherein each member comprises a prismatic joint having first and second ends and comprising inner and outer shells and a motor for powered linear movement of the outer shell with respect to the inner shell;

a first powered joint interconnecting the second end of the first member with the first end of the second member, wherein the first powered joint provides movement of the second member with respect to the first member;

wherein the first end of the first member is attached to a powered rotating base and wherein the powered rotating base is movably attached to a component of the wheelchair for powered movement along the component extending around at least a portion of a periphery about the first surface; and a computer controller for controlling movements of the outer shells, first powered joint, rotation of the powered rotating base and movement of the powered rotating base and RSA along the component a sensor associated with one or both outer shells for sensing position information for one or both outer shells and providing said position information to the computer controller; and a user interface to the computer controller for inputting commands for movement of the RSA; wherein the computer controller detects an onset of a dangerous positioning of the RSA and warns the user before and/or during said dangerous positioning of the RSA.

15. The robotic strong arm of claim 14 wherein the second surface is defined by a bed, bench, toilet, chair or the like.

16. The robotic strong arm of claim 14 wherein each of the inner and outer shells of each of the first and second members defines a polygonal cross-section and comprises a double-walled construction made of plastic, reinforced plastic or plastic reinforced with metal or stainless steel rods.

17. The robotic strong arm of claim 14 wherein reversible rotation of the powered rotating base and attached first member allows the second member to be moved toward and/or away from the first surface.

18. The robotic strong arm of claim 14 further comprising an effector attached to the second end of the second member wherein the effector may be used for grasping or manipulating objects.

19. The robotic strong arm of claim 14 wherein the component comprises a track, rod or other structure along which the RSA may be moved to position the RSA adjacent to or near the back, first side or second side of the seat or any point along the periphery between the first and second sides.

20. The robotic strong arm of claim 14 wherein the robotic strong arm may be used for both stand-pivot transfers, where a person on the first surface has some ability to stand and place some weight on the ground and/or for fully dependent transfers, where the person being transferred to or from the first surface is in a sling and the person's weight is fully on the robotic strong arm.

* * * * *